United States Patent
Reindl et al.

(10) Patent No.: US 10,036,657 B2
(45) Date of Patent: Jul. 31, 2018

(54) CAPACITIVE SENSOR COMPRISING INTEGRATED HEATING ELEMENT

(71) Applicant: MICRO-EPSILON Messtechnik GmbH & Co. KG, Ortenburg (DE)

(72) Inventors: Norbert Reindl, Fuerstenzell (DE); Manfred Wagner, Triftern (DE)

(73) Assignee: MICRO-EPSILON Messtechnik GmbH & Co. KG, Ortenburg (DE)

(*) Notice: Subject to any disclaimer, the term of this patent is extended or adjusted under 35 U.S.C. 154(b) by 0 days.

(21) Appl. No.: 14/443,953

(22) PCT Filed: Jul. 4, 2014

(86) PCT No.: PCT/DE2014/200303
§ 371 (c)(1),
(2) Date: May 19, 2015

(87) PCT Pub. No.: WO2015/028003
PCT Pub. Date: Mar. 5, 2015

(65) Prior Publication Data
US 2015/0300844 A1    Oct. 22, 2015

(30) Foreign Application Priority Data

Aug. 28, 2013  (DE) .................. 10 2013 217 170
Jan. 7, 2014   (DE) .................. 10 2014 200 060

(51) Int. Cl.
*G01D 5/24*    (2006.01)

(52) U.S. Cl.
CPC ...................................... *G01D 5/24* (2013.01)

(58) Field of Classification Search
CPC .... G01R 27/2605; G01R 31/028; G01D 5/24; G06K 9/0002; H03K 17/962
See application file for complete search history.

(56) References Cited

U.S. PATENT DOCUMENTS

| | | | | |
|---|---|---|---|---|
| 5,090,128 A | * | 2/1992 | Roux | G01C 5/04 33/366.19 |
| 5,485,747 A | | 1/1996 | Antikainen et al. | |
| 5,974,898 A | * | 11/1999 | Golderer | G01L 1/142 73/862.043 |
| 6,126,312 A | * | 10/2000 | Sakai | G01N 27/121 324/664 |

(Continued)

FOREIGN PATENT DOCUMENTS

| | | | | |
|---|---|---|---|---|
| DE | 19601078 A1 | | 7/1997 | |
| DE | 19724168 C1 | * | 8/1998 | ............. B60N 2/002 |

(Continued)

OTHER PUBLICATIONS

English Translation of DE 19724168 C1, Henninger dated Aug. 6, 1998.*

(Continued)

*Primary Examiner* — Jermele M Hollington
*Assistant Examiner* — Suresh K Rajaputra
(74) *Attorney, Agent, or Firm* — Alston & Bird LLP

(57) ABSTRACT

The invention relates to a sensor element (1) of a capacitive sensor consisting of two or more layers of a substrate (2), the electrodes (3) of the sensor being inserted between said layers. The sensor element is characterized in that a heating element (5) is integrated into said sensor element (1).

20 Claims, 2 Drawing Sheets

(56) References Cited

U.S. PATENT DOCUMENTS

| | | | | |
|---|---|---|---|---|
| 6,572,830 | B1* | 6/2003 | Burdon | F04B 19/006 |
| | | | | 156/89.11 |
| 6,812,821 | B2 | 11/2004 | Fujita et al. | |
| 6,951,587 | B1* | 10/2005 | Narushima | C23C 16/4586 |
| | | | | 118/728 |
| 7,325,457 | B2 | 2/2008 | Fujimori et al. | |
| 8,833,160 | B2* | 9/2014 | Hoenicka | G01D 5/00 |
| | | | | 73/431 |
| 2004/0026268 | A1* | 2/2004 | Maki | G01N 27/407 |
| | | | | 205/784 |
| 2006/0151465 | A1* | 7/2006 | Lin | H01L 21/67109 |
| | | | | 219/444.1 |
| 2006/0186901 | A1* | 8/2006 | Itakura | G01N 27/223 |
| | | | | 324/689 |
| 2007/0068266 | A1* | 3/2007 | Fujimori | B60C 23/0408 |
| | | | | 73/724 |
| 2009/0015271 | A1* | 1/2009 | Elliott | G01B 7/023 |
| | | | | 324/690 |
| 2011/0155262 | A1 | 6/2011 | Ante et al. | |
| 2012/0024075 | A1* | 2/2012 | Peng | G01L 9/0073 |
| | | | | 73/724 |

FOREIGN PATENT DOCUMENTS

| | | |
|---|---|---|
| DE | 69434130 T2 | 10/2005 |
| DE | 102008031647 A1 | 2/2010 |
| DE | 102009060002 A1 | 6/2011 |
| JP | 2005-031090 A | 2/2005 |
| JP | 2008-039550 A | 2/2008 |

OTHER PUBLICATIONS

International Searching Authority, International Search Report (ISR) and Written Opinion for International Application No. PCT/DE2014/200303, dated Nov. 3, 2014, 10 pages, European Patent Office, The Netherlands.

The International Bureau of WIPO, International Preliminary Report on Patentability (English translation of ISA's Written Opinion) for International Application No. PCT/DE2014/200303, dated Mar. 1, 2016, 7 pages, Switzerland.

German Patent and Trade Mark Office, Office Action for Application No. 102014200060.2, dated Nov. 14, 2016, 7 pages, Germany.

* cited by examiner

ND HEATING ELEMENT

CAPACITIVE SENSOR COMPRISING INTEGRATED HEATING ELEMENT

CROSS REFERENCE TO RELATED APPLICATIONS

This application is a national stage application, filed under 35 U.S.C. § 371, of International Application No. PCT/DE2014/200303 filed Jul. 4, 2014, which claims priority to German Application No. 10 2013 217 170.6 filed Aug. 28, 2013 and German Application No. 10 2014 200 060.2 filed Jan. 7, 2014, the contents of both of which as are hereby incorporated by reference in their entirety.

BACKGROUND

Technical Field

The present invention concerns a sensor element of a capacitive sensor, consisting of two or more layers of a substrate between, or in, which the electrodes of a sensor are incorporated. The invention further concerns a sensor with a corresponding sensor element.

Description of Related Art

Capacitive sensors are usually designed with superficial electrodes. Especially for harsh environments it is now state of the art to place the electrodes behind glass, for example, or to provide them with suitable non-metallic protective caps, e.g. of plastic or ceramic. A particularly favorable type of sensor configuration is known from DE 10 2009 060002, where the electrode of a capacitive distance sensor is integrated into a sensor element comprising multiple ceramic layers.

BRIEF SUMMARY

Capacitive distance or position sensors operate according to the principle of a plate capacitor, the capacitance of which is evaluated as follows:

$$C = \varepsilon_0 \cdot \varepsilon_r \cdot \frac{A}{d}$$

The measured value distance d is assessed alongside the surface A of the electrode. The dielectric constant $\varepsilon_r$ of the medium is included in the measured value as a parameter.

A distance or position signal is created from this by means of the appropriate electronics. Since the capacitance of a plate capacitor is dependent not only on the position of the measurement object, but also on the dielectric properties of the medium in the measuring gap, sensors of this type are sensitive to changes in the medium if its dielectric properties change. Particularly critical here is the presence of water, because, due to its very high dielectric constant $\varepsilon_r = 81$, water has a major impact on the capacitance and, consequently, on the measurement signal.

Capacitive sensors are available in a large variety of designs, for example with a simple measuring electrode, with additional guard electrodes (guard principle) and with exterior ground electrodes.

If measurement with a capacitive sensor is to be conducted in a very moist environment or directly on a water surface, for example, condensation has to be expected. Condensation has a non-linear effect that is dependent on a variety of parameters, e.g. cleanliness of the surface, temperature change, surface activity, etc. Therefore the presence of water condensation changes the measurement signal. Since, due to their high resolution owing to the principles involved, capacitive sensors are often used in measurement tasks requiring the highest degree of accuracy, condensation has a pronounced negative effect on the measurement signal.

A protective cap or cover does not help here, because it is insignificant when the disruptive medium is in the measuring gap. As soon as the medium is between the electrodes it changes the capacitance and with it the measured value. Because of this known effect, capacitive sensors are regularly used in environments in which moisture does not occur. However, for very high-resolution measurements in particular, even the slightest amount of condensation can have a negative effect. This can be the case e.g. for industrial applications in areas where there is high humidity due to the climatic conditions.

One special application is the use of capacitive sensors for level measurement against a water surface with a water scale, also known as hydrostatic level measurement. Such water scales are used in larger installations in which very high degree of evenness, more specifically an exact alignment to local gravity, is required, as for example in large accelerators.

Such a device with a hydrostatic level measurement is known from U.S. Pat. No. 5,090,128 A is—considered by itself.

A system of communicating pipes connects measuring tanks distributed across the installation with one another. Inside is water, the surface of which through the pipes represents a widely ramified water scale, whereby the horizontal alignment of the installation is checked.

A capacitive position sensor is mounted inside on a bracket above the water surface. The sensor is coated with protective coating. A power transistor is mounted on the back of the sensor as a heater to prevent condensation. This known solution is complex in its design and manufacturing, however, because a number of components have to be assembled. Above all, the subsequent attachment of elements means a high susceptibility to errors, particularly in terms of leak tightness against the intrusion of water into the measuring element(s). Due to non-homogeneous heat input, attaching the heating transistor on the back can result in bulges on the surface of the sensor caused by thermal expansion of the materials used. This changes the distance to the surface, and thus the measured value. A bulge is particularly disadvantageous for capacitive sensors, because it causes not negligible distortion of the measured value.

Hydrostatic level measurement is a matter of measuring against a water surface in a closed system. In a measurement range of several millimeters, this measurement must still provide a resolution of less than 0.1 μm and ensure long-term stability. Permanent measurement against water inevitably leads to condensation on the opposite sensor. Condensation is commonly calibrated out as a sliding offset. However, due to the required stability, this type of compensation is not productive.

The condensation problem can be avoided with an additional heating element. The sensor is thereby kept at a slightly higher temperature compared to its environment, preventing condensation.

Experience shows that sensors with a bare surface (electrodes exposed) do not provide long-term stable operation, despite heating. The reason for this can be intrusion of moisture caused by big temperature changes despite heating, water splashes or sloshing during filling. Intruded moisture leads to sensor drift. Depending on the heat output, this drift can be partially eliminated again. Soiling can also to lead to low impedance, however, and have lingering adverse effects on the functionality of the sensor. For this reason the state of art applies additional protective elements in front of electrodes. Taking a safety zone (e.g. air gap) between the heated sensor and a protective coating into consideration during planning reduces the usable measurement range. If the protective coating is directly on the sensor, there is the danger that heat is transferred to this coating and the functionality of the sensor is changed.

Therefore, the present invention is based on the task to provide a capacitively operating sensor element and a sensor with a corresponding sensor element for long-term high-resolution stable measurement. Such a sensor should in particular be suitable for use in hydrostatic level measurement.

The above-mentioned task is solved with the features of the independent claims 1 and 10. According to that the generic sensor element is characterized in that a heating element is integrated into the same sensor element. The sensor according to the invention comprises such a sensor element.

According to the invention, it is essential that the heating element is arranged within the sensor. The heating element is advantageously arranged in the center of the sensor element.

The condensation on surfaces that is disruptive in the in the state of the art depends on the dew point, or rather the dew point temperature. Condensation is prevented if the corresponding surface is kept at a slightly higher temperature than the surrounding humid air. A temperature below that of the dew point is thus avoided. The condensation problem is solved with a(n) (ohmic) heating element in the sensor. This keeps the sensor at a temperature that is slightly higher than that of its environment, thus reliably preventing condensation.

According to the invention, the heating element is inserted into the sensor element in one assembly process.

The electrodes (measuring electrode and, if applicable, guard electrode and/or ground electrode) and the heater are integrated into one compact, multi-layered sensor element that can be provided with an additional hermetically sealed coating. The individual layers are pressed in and sintered in one joint process, which results in an absolute impermeability.

The heater consists of strip conductors of a suitable material that are passed through by a flowing current. Due to the ohmic resistance of the conductor strips, electrical energy is converted to heat that serves to warm the sensor element. The heater is inserted into the center of the multi-layer element, which virtually eliminates deformation of the measuring element caused by uneven heat input. Because of the sintering, the coating over the electrodes is permanently connected to the sensor. The heat output can be kept low by using appropriate integration. Since ceramic generally exhibits good heat conductivity, heat distribution is homogeneous. The heating coils can be configured as strip conductors across the entire surface, and in one or more levels. The strip conductor can also be configured as a singular heating surface.

The structure of the sensor can be implemented with a variety of materials, e.g. standard printed circuit board material such as e.g. FR4. A particularly favorable structure is achieved with ceramic layers, for example in a LTCC or HTCC design. A sintered sensor made of ceramic or glass ceramic is chemically stable.

The individual layers are constructed in such a way that there is no mutual interference. Thus the heating coil is configured in a bifilar manner, for example, so as to prevent the occurrence of magnetic fields. The capacitive electrodes can be further shielded by a conductive shielding layer that is kept at a defined potential.

The heater can be supplied with alternating current or direct current. The use of alternating current requires slightly higher circuit complexity, and can affect the capacitive measurement signal. The use of direct current, on the other hand, can cause electromigration. Which specific power supply to select, depends on the particular application. In the present case, i.e. for hydrostatic level measurement, direct current is applied to the heating coils, which does not have a negative effect on the capacitive sensor, even without an intermediate shield.

There is very little loss of measurement range with the direct application of a protective coating on the integrated electrodes. With the LTCC process it is possible to use ceramic films, for example, with a thickness of only 25 µm, which allows the coating to be kept very thin.

The heat output can be regulated depending on the ambient conditions; for example with lower outputs, if the measurements are only at higher humidity.

Since the dew point is dependent on the ambient temperature, it is favorable to regulate, i.e. adapt, the heat output as the ambient temperature changes, so that just the right amount of output is always needed to prevent condensation. The control (i.e., a control or controller 19) could be implemented with a constant current. In order to be able to account for changing ambient temperatures, it may be necessary to take a temperature measurement (i.e., via a temperature sensor 20). The temperature at the surface of the sensor element must be slightly higher than the ambient temperature. Heat is dissipated across the surface of the sensor element via radiation and/or convection; heat that has to be replaced by the heater in the sensor element. This creates a temperature gradient in the sensor element. The outside temperature can be determined with the aid of this temperature gradient, by measuring the temperature (i.e., via the temperature sensor 20) at a location near the surface. The temperature measurement can occur in a particularly advantageous manner via the capacitive electrode of the sensor. The ohmic resistance of the electrode can be measured by overlaying the alternating current signal with a direct current for the actual position measurement. This is temperature dependent, and can therefore be used to determine the temperature.

This allows control of the heat output to be realized in a particularly simple and cost-effective manner. However, other known types of control are also possible, e.g. constant current control.

At constant ambient conditions, i.e. when the ambient temperature does not fluctuate, or fluctuates only to a very small degree, control can be omitted. Heating can then occur using experimentally determined heat output. This depends on the ambient conditions and the assembly conditions of the sensor.

The solution depicted here is simple and operates reliably, because all the components are sintered into a hermetically sealed body and are thus optimally protected against moisture.

The activation for the heater and the analysis of the capacitive measurement signals can be placed in different locations. Integration directly into the upper part of the housing of the measuring system is advantageous. The technology being used, however, also allows the electronics to be directly attached, partially or completely, on the back of the measuring element. Due to the heat of an electronic evaluation unit, the heat output can be reduced or even omitted.

There are a variety of ways to embody the teaching of the present invention in a favorable manner and to develop it further. Reference is made to the claims subordinate to Claim 1, as well as to the following discussion of a preferred design example of the invention using the drawing. In conjunction with the discussion of the preferred design example using the drawing, preferred embodiments and further developments of the teaching are discussed in general as well. The drawing shows

DETAILED DESCRIPTION OF VARIOUS EMBODIMENTS

Figure 1:
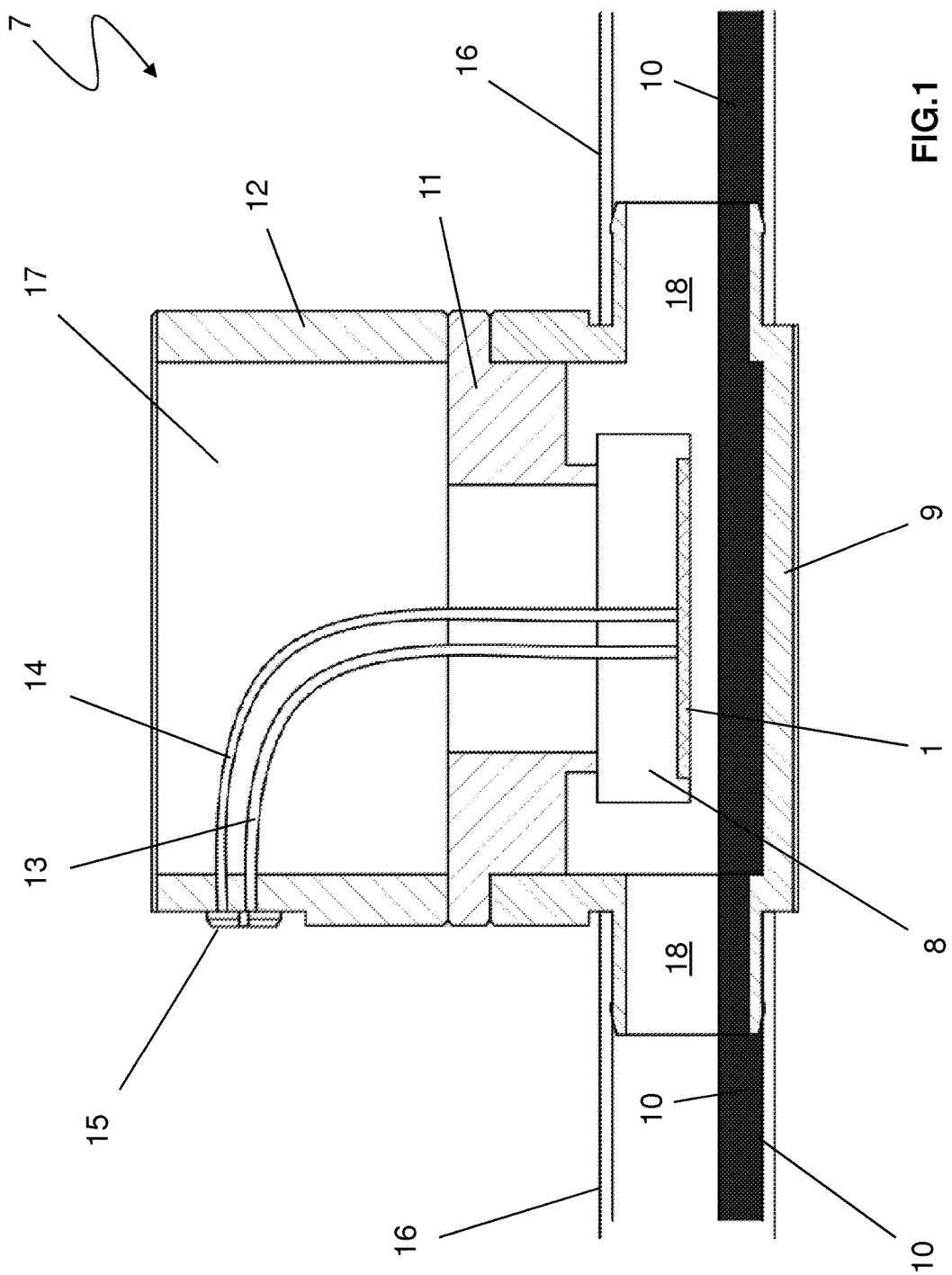
FIG. 1 in a schematic view, in a section, a design example of a capacitive sensor in a water scale for hydrostatic level measurement and FIG. 2 in a schematic view a design example of the sensor element of the sensor from FIG. 1, whereby the sensor element is equipped with multiple layers of a substrate, with integrated electrodes and with an integrated heating element.

FIG. 1 shows the use of a sensor element according to the invention in a water scale for hydrostatic level measurement. The sensor element 1 used is shown in detail in FIG. 2.

The schematic depiction in FIG. 1 shows the specific application of the sensor element 1 in hydrostatic level measurement, whereby a corresponding water scale is indicted in FIG. 1 with reference sign 7.

The sensor element 1, which measures against the height of the water surface, i.e. against the water level 10, is one of the essential components of the water scale 7.

The sensor element 1 is held by a sensor element mount 8, which is in turn connected to an upper part 12 of the measuring system by an intermediate bracket 11. A connector plug 15—outside—is provided in the wall of the upper part 12 of the measuring system, whereby a line 13 for the capacitive sensor signals and a line 14 for the power supply of the sensor heating extend between the sensor element 1 and the connector plug 15.

The installation space 17 provided within the upper part 12 of the measuring system can be used for the integration of the required electronics.

FIG. 1 further indicates that the housing in the lower part includes connection nozzles 18 on both sides, to which a connecting pipe 16, or a hose, is attached. The water level 10 extends through the measuring system via the connecting pipe 16 and the two connection nozzles 18, and can measure the sensor element 1 against the water level surface, whereby the water level 10 and consequently the surface in FIG. 1 is depicted by a black area.

Figure 2:
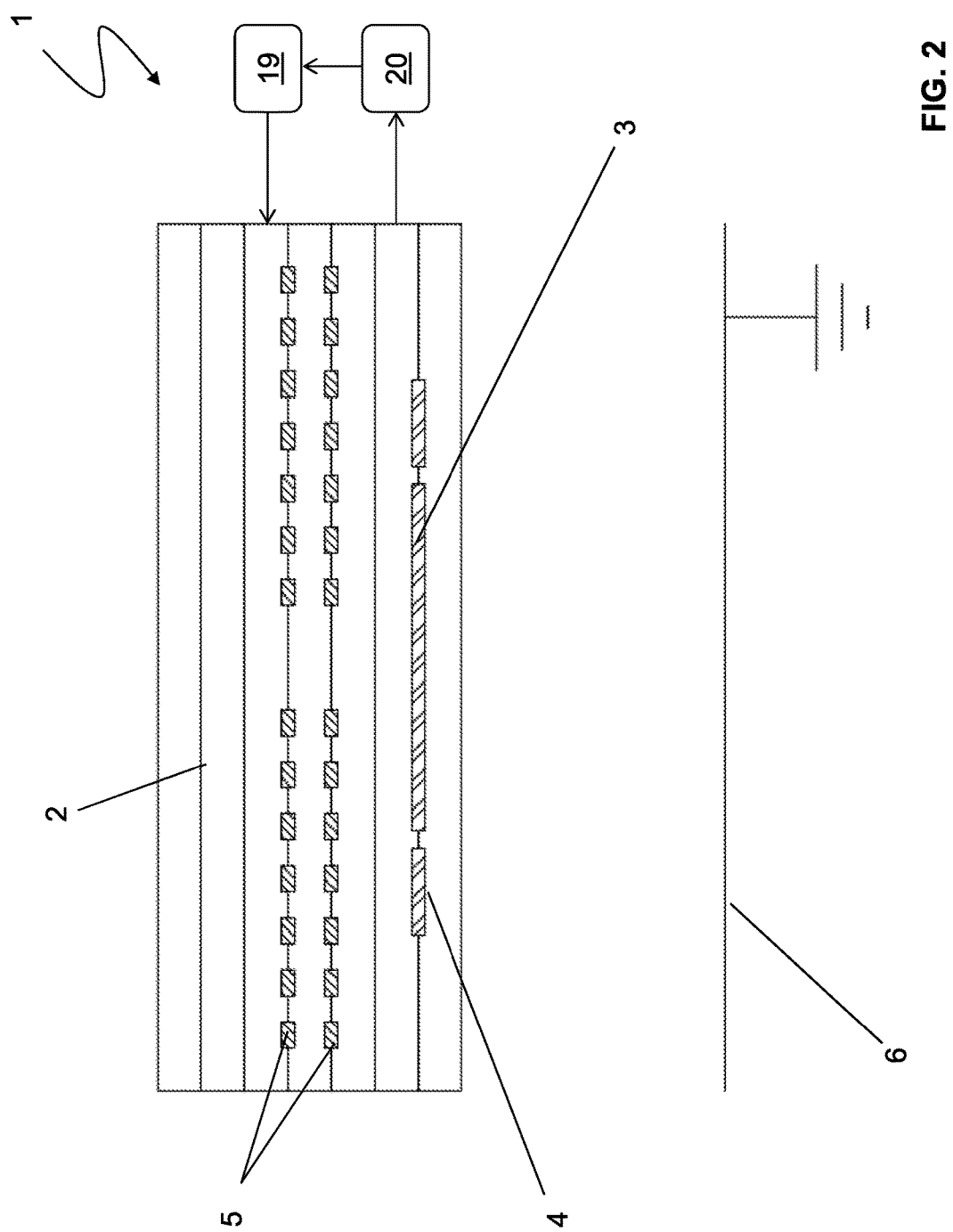

FIG. 2 shows in detail the sensor element 1, as it is used in the measuring system shown in FIG. 1.

In accordance with the general description, sensor element 1 comprises an integrated heater.

Specifically, the sensor element 1 is constructed of a multi-layer ceramic substrate 2, whereby the electrodes 3 (measuring electrodes) are integrated. In addition, a guard electrode 4 is provided.

The implemented strip conductors are designed approximately centered as a heating element 5. From there the heat output can spread evenly in the sensor element 1, without causing a bulge in one side or the other.

FIG. 2 further shows the counter electrode 6 in a schematic depiction.

For the heating element 5 shown in FIG. 2 the provision of an integrated heating device, realized by the use of corresponding heating elements 5 in the sense of a resistance heater, is essential.

With respect to additional advantageous embodiments of the sensor element according to the invention and the sensor according to the invention, in order to avoid repetitions, we refer to the general part of the description and to the attached claims.

Finally, it should expressly be noted that the above-described design example of the sensor element according to the invention and the sensor according to the invention merely serves to discuss the claimed teaching, but does not, however, limit it to this design example.

LIST OF REFERENCE SIGNS 1 sensor element (with integrated heating)
2 substrate, multi-layer ceramic substrate
3 electrode, measuring electrode
4 guard electrode (guard)
5 heating element (strip conductors arranged in a bifilar manner)
6 counter electrode
7 hydrostatic level measurement
8 sensor element mount
9 base of the measuring system
10 water level
11 intermediate bracket
12 measuring system—upper part
13 line for capacitive sensor signals
14 power supply line for the sensor heating
15 connector plug (in the wall of the upper part of the measuring system)
16 connecting pipe between the measuring systems, hose
17 installation space, available for integrated electronics
18 connection nozzle

The invention claimed is:

1. Sensor element (1) of a capacitive sensor, said sensor element consisting of:
   a substrate (2) having two or more layers,
   one or more electrodes (3) incorporated between the two or more layers of the substrate (2), and
   one or more heating elements (5) integrated into said substrate (2) of said sensor element (1),
   wherein:
      the electrodes (3), the one or more heating elements (5), and the substrate (2) are sintered into a single hermetically sealed body so as to protect said sensor element against moisture; and
      the one or more heating elements (5) are centered between a top surface and a bottom surface of the substrate (2) so as to virtually eliminate deformation of the sensor element (1) caused by uneven heat input.

2. Sensor element (1) according to claim 1, wherein the substrate (2) is made of ceramic or designed as printed circuit board material.

3. Sensor element according to claim 1, wherein the heating element (5) is designed as a bifilar coiled strip conductor.

4. Sensor element according to claim 1, wherein the heating element (5) is designed as a heating surface.

5. Sensor element according to claim 1, wherein the heating element (5) is regulated by a control.

6. Sensor element according to claim 5, wherein the control operates with constant current.

7. Sensor element according to claim 5, wherein the control is equipped with an additional temperature sensor.

8. Sensor element according to claim 1, wherein one electrode (3) of the sensor is designed as a temperature sensor with a direct current supply.

9. Sensor with a capacitive sensor element (1) according claim 1.

10. Sensor system or sensor according to claim 1, for application in hydrostatic level measurement (7), in particular as component of a water scale.

11. Sensor element (1) of a capacitive sensor, said sensor element consisting of:
   a substrate (2) having two or more layers,
   one or more electrodes (3) incorporated between the two or more layers of the substrate (2), and
   one or more heating elements (5) integrated into said substrate (2) of said sensor element (1),
   wherein:
      the electrodes (3), the one or more heating elements (5), and the substrate (2) are sintered into a single hermetically sealed body so as to protect said sensor element against moisture;
      the one or more heating elements (5) are two heating elements both fully integrated into the substrate (2) so as to define a plurality of discrete areas of heating elements in a cross-section plane of the substrate (2); and
      the two heating elements (5) are collectively centered between a top surface and a bottom surface of the substrate (2) so as to virtually eliminate deformation of the sensor element (1) caused by uneven heat input.

12. Sensor element (1) according to claim 11, wherein the substrate (2) is made of ceramic or designed as printed circuit board material.

13. Sensor element according to claim 11, wherein the two heating elements (5) are designed as a bifilar coiled strip conductor.

14. Sensor element according to claim 11, wherein the two heating elements (5) are aligned relative to one another in a horizontal direction and define a coil.

15. Sensor element according to claim 11, wherein the two heating elements (5) are regulated by a control.

16. Sensor element according to claim 15, wherein the control operates with constant current.

17. Sensor element according to claim 15, wherein the control is equipped with an additional temperature sensor.

18. Sensor element according to claim 11, wherein one electrode (3) of the sensor is designed as a temperature sensor with a direct current supply.

19. Sensor with a capacitive sensor element (1) according claim 11.

20. Sensor system or sensor according to claim 11, for application in hydrostatic level measurement (7), in particular as component of a water scale.

* * * * *